UNITED STATES PATENT OFFICE.

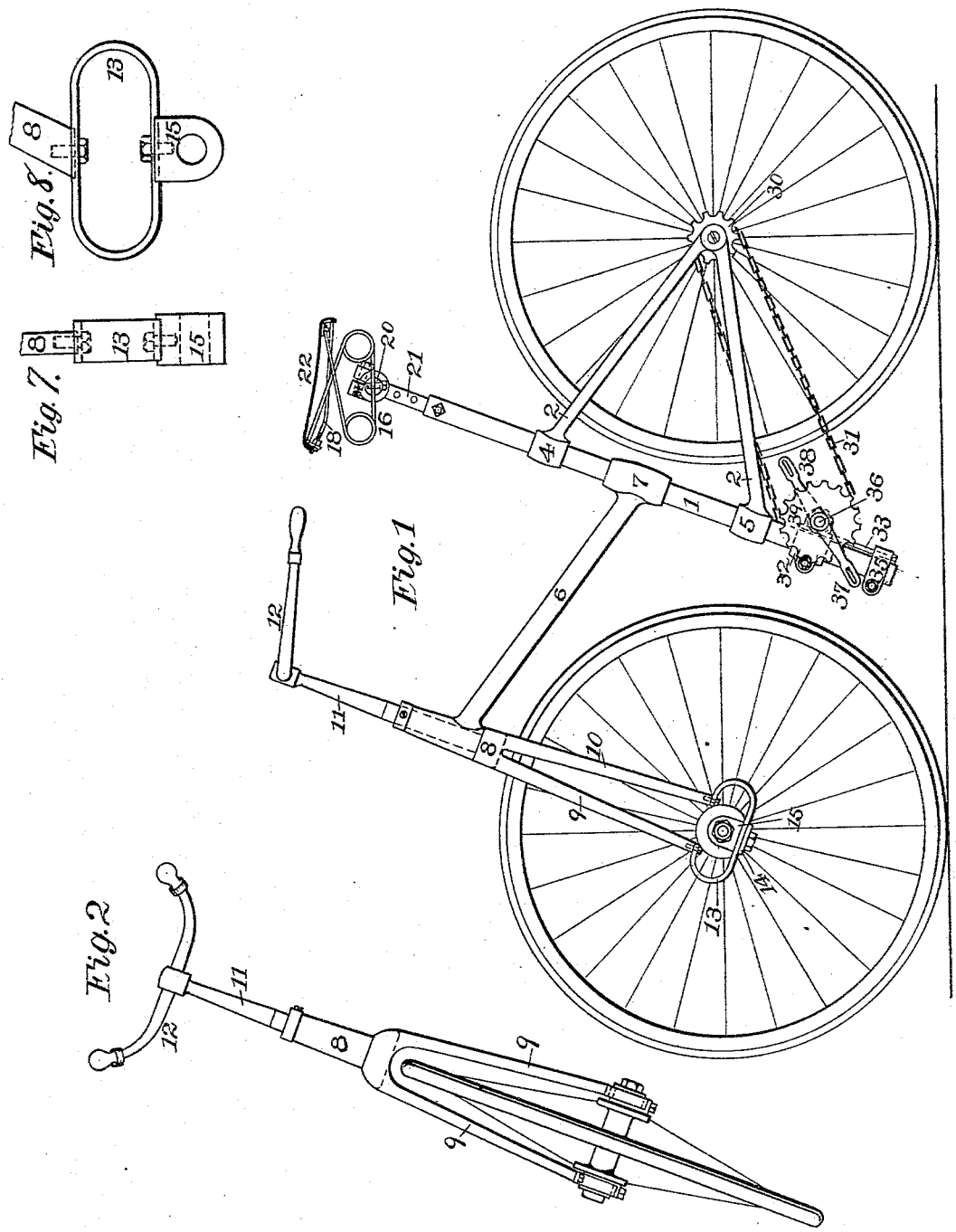

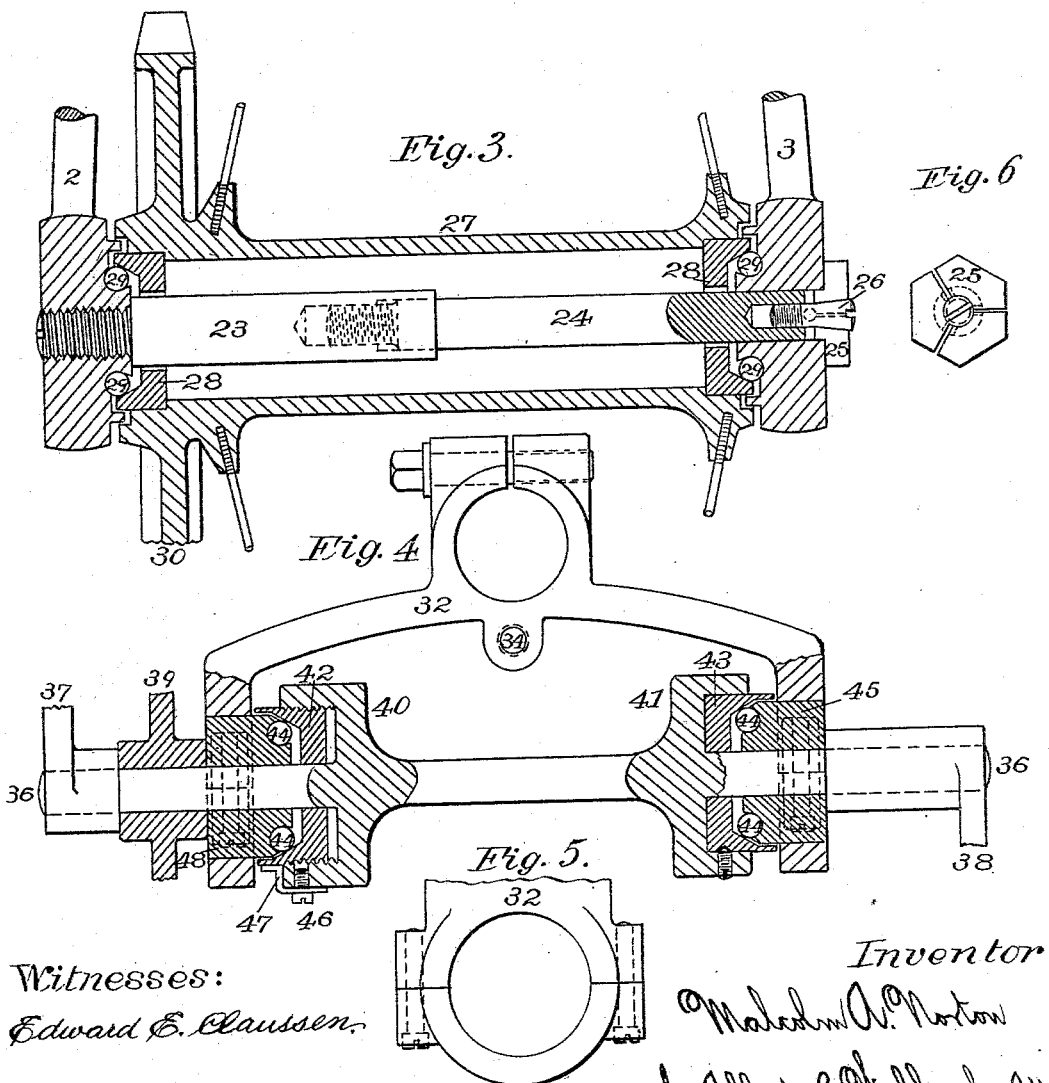

MALCOLM A. NORTON, OF HARTFORD, CONNECTICUT.

VELOCIPEDE.

SPECIFICATION forming part of Letters Patent No. 401,295, dated April 9, 1889.

Application filed December 20, 1888. Serial No. 294,169. (No model.)

*To all whom it may concern:*

Be it known that I, MALCOLM A. NORTON, of Hartford, Connecticut, have invented a new and useful Improvement in Velocipedes, of which the following description and claims constitute the specification, and which is illustrated by the accompanying two sheets of drawings.

This invention relates to a velocipede having the features specified by the claims at the end of this specification.

Figure 1 of the drawings is a side view, and Fig. 2 is a front view, of my new velocipede shown as a bicycle. Fig. 3 is a central horizontal section of the axle of the rear wheel and of the ball-bearing boxes thereof. Fig. 4 is a plan view, partly in section, of the axle of the crank-shaft and of the ball-bearing boxes thereof. Fig. 5 is a side view of one of the ends of the bracket which supports those boxes. Fig. 6 is a view of the right-hand end of the axle of Fig. 3. Figs. 7 and 8 are views of a modified form of the spring and other devices by which the velocipede-frame is supported from the forward wheel.

The numeral 1 indicates the central section of the frame of the velocipede, consisting of a plain straight rod, preferably made tubular throughout its length to secure lightness.

The numerals 2 and 3 indicate two V-shaped frame-sections, the apexes of which are perforated to receive the axle of the rear wheel of the bicycle, and the upper ends of which are united in the clamp 4, while the lower ends of which are united in the clamp 5, both of which clamps firmly clasp the central section, 1, of the frame.

The numeral 6 denotes the reach of the velocipede-frame, the rear end of which is provided with the clamp 7, fixed to the section 1 between the clamps 4 and 5, and the front end of which is pivoted to the body of the fork 8. Each of the bifurcations of that fork may be itself bifurcated, as shown in Fig. 1, or it may be single, as shown in Figs. 10 and 11, and two of those sub-bifurcations are indicated in Fig. 1 by the numerals 9 and 10. The upper part of the fork is preferably made as a separate piece, 11, inserted in the body of the fork 8, and the handle (numbered 12) is fixed thereto, as indicated in Figs. 1 and 2.

The bifurcations 9 and 10 are supported by the spring 13, the center of which rests upon the flange 14 of the hanger 15, which hanger depends from one end of the axle of the forward wheel, and the corresponding bifurcations of the fork 8 on the other side of the forward wheel are correspondingly supported.

The axle of the rear wheel consists of the parts 23 and 24, united midway of their length by a screw-threaded joint. The outer end of the part 23 is tapped into the apex of the V-shaped frame-section 2, while the outer end of the part 24 consists of the split head 25. The screw 26 is tapped into the axis of the axle-section 24, and the solid tapering head of that screw occupies a tapering recess in the center of the split head 25. The axle of the rear wheel may be shortened and the V-shaped frame-sections 2 and 3 be drawn toward each other, and any undue play in the ball-bearings be thus taken up by simply turning the head of the axle-section 24, and that head, when thus turned to the proper extent, may be fixed in that position and the axle thus fixed in length by simply turning the screw 26, and thus forcing the sections of the split head away from each other and into rigid contact with the frame-section 3. The hub of the rear wheel is indicated by the numeral 27 and is hollow throughout its length, and each end of its interior is provided with a ball-bearing box, 28, which incloses a series of balls, 29, between its interior inclined circular wall and the concave groove on the inside of the adjacent V-shaped frame-section. The sprocket-wheel 30 is fixed to the hub of the rear bicycle-wheel and receives motion through the chain 31.

The bracket 32 is clamped to the central section, 1, of the bicycle-frame, and is adjustable thereon by means of the screw-rod 33, the upper end of which is tapped into the hole 34 in the bracket 32, and the lower end of which is held against longitudinal movement in a corresponding hole in the clamp 35, which clamp is fixed to the lower end of the central section, 1, of the bicycle-frame. The shaft 36 turns in the ends of the bracket 32, and carries the cranks 37 and 38 and the sprocket-wheel 39 outside of that bracket, and that part of that shaft which is between the two ends of that bracket is provided with the hubs 40 and 41, which hubs inclose the ball-bearing boxes 42 and 43, respectively. The ball-bearing box 43 is rigidly fixed within the hub 41 and incloses a series of balls, 44, between its inner inclined circular wall and a concave groove on the inner end of the bushing 45, which is clamped in one end of the bracket 32. The ball-bearing box 42 is longitudinally adjustable on the shaft 36 within the hub 40 by means of the screw 46 operating to press the foot 47 upon the periphery of that box when the box has been properly adjusted by being screwed outward or inward within the hub 40. That ball-bearing box also incloses a series of balls, 44, between its inner inclined circular wall and a concave groove on the inner end of the bushing 48, which bushing is clamped in the other end of the bracket 32.

The modifications shown in Figs. 10 and 11 consist in reversing the position of the hanger 15, so as to make it sustain the spring 13 on its upper side, and consist in making the spring 13 continuous, and consist also in supporting a single bifurcation of the fork 8 upon the upper side of that spring.

The tension of the chain 31 may be adjusted by turning the screw 33, so as to raise or depress the bracket 32 upon the section 1, and thus lengthen or shorten the distance between the shaft 36 and the axle of the rear wheel of the velocipede.

I claim as my invention—

1. A velocipede-frame consisting of the central section, 1, provided with the adjustable saddle-support 21 and the adjustable bracket 32 at or near its upper and lower ends, respectively, the V-shaped sections 2 and 3, fixed to the central section by the clamps 4 and 5 between those ends, and the reach 6, fixed to the central section, 1, between the clamps 4 and 5 by the clamp 7, all substantially as described.

2. The combination of the velocipede-fork 8, each side of which consists of the sub-bifurcations 9 and 10, with the spring 13, supporting one pair of those sub-bifurcations, and a corresponding spring supporting the other pair thereof, and with the axle of a velocipede-wheel supporting those springs, all substantially as described.

3. The combination of the axle-sections 23 and 24, longitudinally adjustable together and fixed at their outer ends to opposite sections of a velocipede-frame, the hub 27, provided with the ball-bearing boxes 28, revolving on those axle-sections and between those frame-sections, and two series of balls turning in bearings between those ball-bearing boxes and those frame-sections, respectively, all substantially as described.

4. The combination of the shaft 36, provided with the hubs 40 and 41, the ball-bearing boxes 42 and 43, inclosed within those hubs and one or both of them adjustable therein, the bushings 45 and 48, fixed in opposite ends of the bracket 32, and two series of balls turning in bearings between those ball-bearing boxes and those bushings, respectively, all substantially as described.

MALCOLM A. NORTON.

Witnesses:
ALBERT H. WALKER,
ESTHER S. WALKER.